Sept. 29, 1953      G. D. WILEY      2,653,846
REAR WHEEL SPLASH GUARD FOR DUMP TRUCKS
Filed Dec. 22, 1952
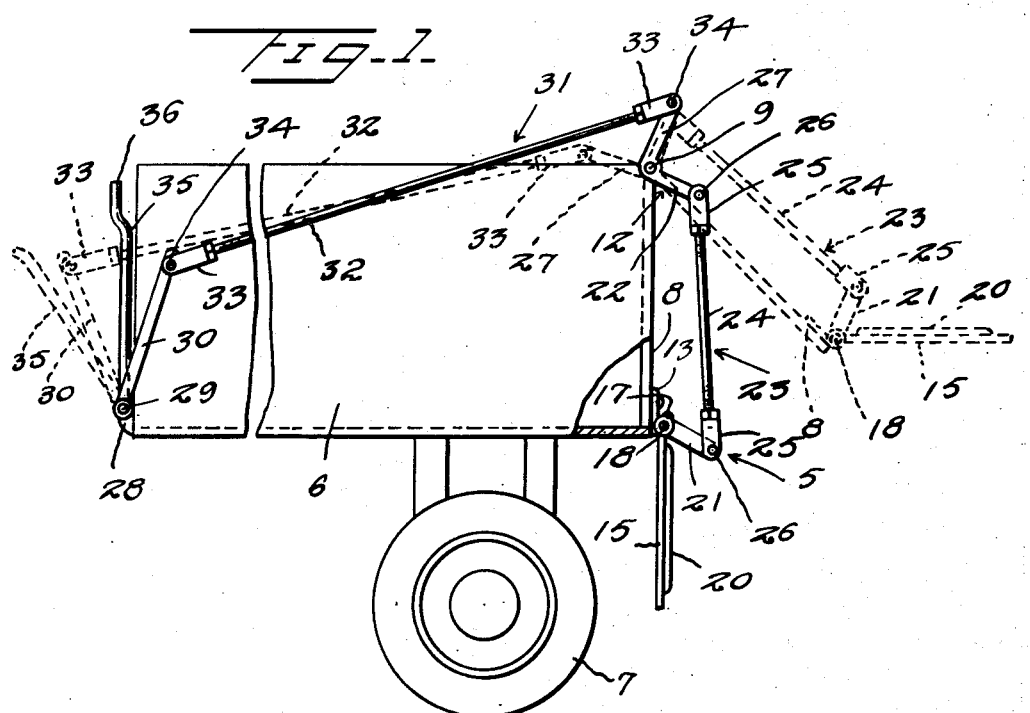
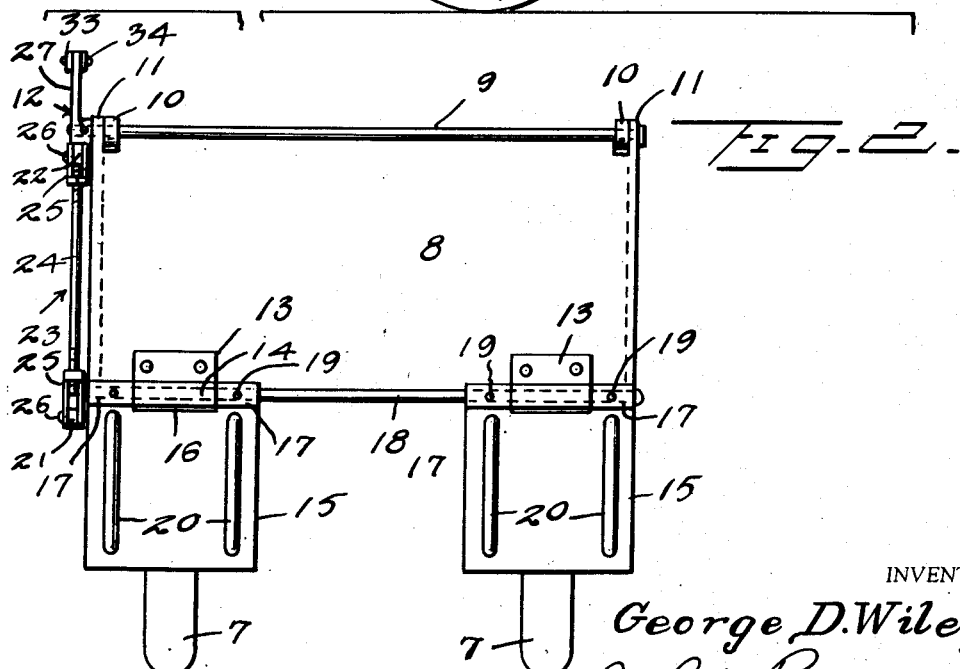
INVENTOR
George D. Wiley
BY John N. Randolph
ATTORNEY Patented Sept. 29, 1953

2,653,846

UNITED STATES PATENT OFFICE 2,653,846

REAR WHEEL SPLASH GUARD FOR DUMP TRUCKS

George D. Wiley, Doylestown, Pa.

Application December 22, 1952, Serial No. 327,255

4 Claims. (Cl. 298—1)

This invention relates to a novel splash guard for trucks and more particularly to a splash guard and splash guard mounting for dump trucks.

Many States now require trucks and trailers not provided with rear wheel fenders to be equipped with splash guards to prevent water, mud, stones or other objects from being thrown upwardly and rearwardly from the rear wheels of a vehicle toward a following vehicle.

Considerable difficulty has been encountered in effectively equipping dump trucks with splash guards or flaps since the flaps or splash guards are bent or broken off by coming in contact with the rear wheels of the vehicle when the dump truck body is tilted or by being struck by the contents of the body during the dumping operation.

Accordingly, it is a primary object of the present invention to provide a novel splash guard or flap mounting primarily adapted for dump trucks by means of which the guards or flaps may be readily raised before tilting of the dump truck body to prevent contact thereof with the vehicle rear wheels or with material discharged from the truck body.

Various other objects and advantages of the invention will hereinafter become more fully apparent from the following description of the drawing, illustrating a presently preferred embodiment thereof, and wherein:

Figure 1 is a fragmentary side elevational view, partly in section, of a portion of a dump truck and showing the splash guards applied thereto, and Figure 2 is a rear elevational view of the same.

Referring more specifically to the drawing, for the purpose of illustrating a preferred application and use of the splash guards and splash guard actuator, designated generally 5 and comprising the invention, a portion of a conventional dump truck has been illustrated in Figure 1 including a part of the dump truck body or box 6 and the rear truck wheels 7. The truck body 6 is intended to be tilted in a conventional manner from its horizontal position as illustrated to a downwardly and rearwardly inclined dumping position, not shown. The dump truck 6 includes a tail gate 8 which is swingably supported at its upper end for outward and upward swinging movement relatively to the rear end of the body or box 6. The tail gate 8 is preferably mounted at its upper end by means of a rod 9 which extends through ears 10 fixed to the tail gate 8 and through ears 11 which are provided at the upper rear corners of the body 6.

One end of the rod 9 extends outwardly from a side of the body 6 and a bell crank 12, forming a part of the splash guards and splash guard actuator 5, is mounted on said end of the rod 9 at the apex of said bell crank. The bell crank 12 may be fixed to the rod 9, if said rod is turnably disposed in the ears 10 and 11 or may be turnably mounted thereon if the rod 9 is fixed to either the ears 10 or the ears 11.

A pair of hinge plates 13 are suitably fastened to the outer side of the lower portion of the tail gate 8 and are provided with aligned hinge barrels 14 which are disposed at approximately the level of the bottom edge of said tail gate. A pair of splash guards or flaps 15, preferably formed of a rigid material such as sheet metal, are each provided with a notched upper edge portion 16 and with rolled portions on either side thereof forming aligned sleeves 17. The notches 16 accommodate the hinge barrels 14 which are disposed between and in alignment with the sleeves 17. A rod 18 extends through the hinge barrels 14 and the sleeves 17 and is turnably disposed in said barrels 14 and is secured by suitable fastenings 19 to the sleeves 17 so that the guards or flaps 15 will turn with the rod 18. The flaps 15 are supported behind and in longitudinal alignment with the rear wheels 7 and are substantially wider than said wheels. The flaps 15 may be reinforced by longitudinally extending pressed out ribs 20.

A lever arm 21 is fixed to one end of the rod 18 and extends downwardly and rearwardly therefrom, when the flaps 15 are independing vertical positions, and is disposed at an acute angle to the plane of said flaps. One arm 22 and the bell crank 12 is connected to the lever arm 21 by an adjustable link connection, designated generally 23, comprising a connecting rod 24 having threaded ends which are adjustably connected to clevises 25, which clevises are in turn pivotally connected at 26 to the arms 21 and 22. The arms 21 and 22 are normally disposed substantially parallel, as illustrated in Figure 1. The other arm 27 of the bell crank 12 extends either upwardly or forwardly with respect to the arm 22.

A bearing 28 is suitably fastened to the front of the truck body or box 6 and provides a journal for an intermediate portion of a short shaft 29 which is rotatably supported thereby transversely of the body 6 and which has one end extending outwardly from the side of said body on which the bell crank 12 is disposed and to which end is secured a lever 30. The lever 30 normally extends upwardly and slightly rearwardly from the outer end of the shaft 29 and the upper portion thereof is connected to the outer end of the bell crank arm 27 by an adjustable link connection 31, of the same construction as the link connection 23, including a rod 32 having threaded ends which are threadedly and adjustably connected to a pair of clevises 33 which are pivotally connected at 34 to the lever 30 and lever arm 27. An actuating lever 35 is fixed to the other end of the shaft 29 at a slight angle to the lever 30 and normally extends upwardly and is disposed in front of a portion of the truck body 6 and has a handle portion 36 at its upper end.

The dump truck body 6 is tilted in any conventional manner so as to be inclined downwardly and rearwardly, and the tail gate 8 is released from a latched, closed position, in any conventional manner, not shown, and is caused to swing outwardly to an open position by the weight of the material within the body or box 6 and due to the tendency of the tail gate to maintain a depending vertical position by gravity. It will be readily obvious that if the flaps or guards 15 remain in their positions of Figures 1 and 2 that said members would strike the rear wheels 7 as the forward end of the body 6 is raised and the rear end thereof is swung downwardly and it will also be apparent that material within the box 6 would strike the flaps or guards 15 when being discharged from the body 6, either of which conditions will break off or seriously damage the guards or flaps. However, with the present invention the truck operator without leaving the driver's seat and prior to tilting the truck body 6, may grasp the handle 36 and swing the lever 35 forwardly toward its dotted line position of Figure 1, to thereby swing the lever 30 forwardly and so that the linkage connection 31 will cause the bell crank 12 to swing counterclockwise and the linkage connection 23 will cause the lever arm 21 and the flaps 15 to swing also in a counterclockwise direction as seen in Figure 1, for elevating the flaps upwardly and rearwardly from a position parallel to the tail gate 8 to an angular position with reference thereto, as illustrated in dotted lines. When the flaps or guards 15 are thus swung upwardly and away from the wheels 7, the dump body 6 may be tilted to an unloading position and the tail gate 8 may be unlatched to be opened by gravity and by the weight of the material within the body 6 without risk of the flaps or guards 15 being damaged by the wheels 7 or the material being dumped. After the dumping operation is completed and the box 6 has been returned to a horizontal position and the tail gate 8 latched in a closed position, the lever 35 may be swung upwardly and rearwardly to return the parts to their full line positions of Figure 1 and to their positions of Figure 2, and in which positions the guards or flaps 15 will effectively function to intercept water, mud, snow, or other articles thrown upwardly and rearwardly by the wheels 7.

Suitable latch means may be provided, not shown, for maintaining the lever 35 in its forward dotted line position of Figure 1 or this may be accomplished by a sufficiently tight frictional engagement of the bearing 28 with the shaft 29 and/or the levers 30 and 35.

Various modifications and changes are contemplated and may obviously be resorted to, without departing from the spirit or scope of the invention as hereinafter defined by the appended claims.

I claim as my invention:

1. A splash guard and actuator for dump trucks comprising a rod adapted to extend across and be turnably supported on the outer side of the lower end of a tail gate of a dump truck body, a pair of rigid flap members or guards fixed to and depending from said rod and adapted to be normally disposed in vertical positions substantially parallel to the tail gate and behind and in alignment with the rear truck wheels, a lever arm fixed to said rod and extending radially therefrom at an angle to said flaps, a bell crank adapted to be pivotally mounted outwardly of one side of the truck body at its rear end and coaxially with the pivotal mounting of the tail gate, a first linkage means connecting said lever arm to a first arm of the bell crank, a lever disposed adjacent the forward end of the truck body, means adapted to be supported on the truck body for pivotally mounting said lever for swinging movement longitudinally of the truck body, and a second linkage means connected to said lever remote from the pivot means thereof and to a second arm of the bell crank whereby when said lever is swung forwardly of the truck body the bell crank, lever arms and flaps will be swung in the same direction for swinging the flaps upwardly and rearwardly relatively to the tail gate and away from the rear truck wheels.

2. A splash guard and actuator as in claim 1, said flaps comprising rigid plates.

3. A splash guard and actuator as in claim 1, each of said linkage means comprising a connecting rod and a pair of clevises adjustably connected to the ends of the connecting rod for varying the length of said linkage means.

4. A splash guard and actuator as in claim 1, and an actuating lever keyed to said lever and adapted to be disposed in front of the dump truck body to be manually actuated by the truck driver for swinging the lever, bell crank and lever arm for raising or lowering said guards or flaps.

GEORGE D. WILEY.

References Cited in the file of this patent

UNITED STATES PATENTS

| Number | Name | Date |
|---|---|---|
| 2,414,676 | Taurman | Jan. 21, 1947 |

FOREIGN PATENTS

| Number | Country | Date |
|---|---|---|
| 280,367 | Great Britain | Nov. 17, 1927 |